United States Patent [19]

Kim et al.

[11] Patent Number: 6,136,739
[45] Date of Patent: Oct. 24, 2000

[54] HIGH DIELECTRIC CERAMIC CAPACITOR COMPOSITION

[75] Inventors: Ho Ki Kim; Yung Park; Kevin Knowles, all of Seoul, Rep. of Korea

[73] Assignee: Korea Advanced Institute of Science & Technology, Taejeon, Rep. of Korea

[21] Appl. No.: 09/265,296

[22] Filed: Mar. 9, 1999

[30] Foreign Application Priority Data

Mar. 30, 1998 [KR] Rep. of Korea ................ 98-10937

[51] Int. Cl.$^7$ ................................. C04B 35/497
[52] U.S. Cl. ........................................... 501/134
[58] Field of Search .............................. 501/134

[56] References Cited

U.S. PATENT DOCUMENTS

| | | | |
|---|---|---|---|
| 4,078,938 | 3/1978 | Yonezawa et al. | 501/134 |
| 4,742,031 | 5/1988 | Ohya et al. | 501/134 |
| 4,829,030 | 5/1989 | Ohya et al. | 501/134 |
| 5,180,699 | 1/1993 | Terada et al | 501/134 |

FOREIGN PATENT DOCUMENTS 58-87700 7/1977 Japan .............................. H01B 3/12

OTHER PUBLICATIONS

Shrout and Halliyal, "Preparation of Lead–Based Ferroelectric Relaxors for Capacitors," *Am. Ceram. Soc. Bull.* 66(4) 704–11 (1987).

Lanagan etl al., "Delectric Behavior of the Relaxor $Pb(Mg_{1/3}Nb_{2/3})O_3$–$PbTiO_3$ Solid–Solution System in the Microwave Region," *J. Am. Ceram. Soc.* 72(3) 481–3 (1989).

*Primary Examiner*—Karl Group
*Attorney, Agent, or Firm*—Chapman & Cutler

[57] ABSTRACT

There is disclosed a high dielectric ceramic composition for capacitors, which comprises $(1-x)Pb(Fe_{1/2}Ta_{1/2})O_3 xPb(Fe_{1/2}Nb_{1/2})O_3$ wherein $0.35 \leq x \leq 0.65$, and 0.01–0.5 % by weight of manganese, chromium or cobalt. The composition can be sintered at a temperature of 1,000° C. with a high dielectric constant and a low dielectric loss coefficient.

4 Claims, No Drawings

HIGH DIELECTRIC CERAMIC CAPACITOR COMPOSITION

BACKGROUND OF THE INVENTION

1. Field of the invention

The present invention relates, in general, to dielectric ceramic capacitor compositions and, more particularly, to high dielectric ceramic capacitor compositions which can be sintered at low temperatures with low temperature-dependent dielectric loss coefficients.

2. Description of the Prior Art

Ceramic compositions which comprise $BaTiO_3$ in combination with $CaZrO_3$ and/or $CaSnO_3$ have been widely used as dielectrics for capacitors. The high sintering temperatures (1,200–1,400° C.) for these ceramics, however, compel layer-built condensers made from these ceramics to use internal electrodes made of precious metals, such as platinum (Pt), gold (Au), palladium (Pa) and the like. Thus, in order to utilize relatively low-priced metals, such as silver (Ag) and nickel (Ni), there is a need to develop dielectric ceramic compositions which can be sintered at a temperature lower than 1,000° C.

Japanese Pat. Laid-Open Publication No. 52-87700 discloses $Pb(Fe_{1/2}Nb_{1/2})O_3$ and $Pb(Fe_{1/2}W_{1/2})O_3$ compositions, which are asserted to meet the low temperature sintering condition. Japanese Pat. Laid-Open Publication No. 53-110500 suggests a modified composition which is improved in physical properties by adding silicon (Si) and manganese (Mn) to the composition of the supra patent. The layer-built condensers employing these dielectric ceramic compositions, however, are found to be problematic in practice because the ceramic compositions are poor in temperature-dependent dielectric loss coefficient.

There have been developed $Pb(B_1, B_2)O_3$-based dielectric relaxor compositions (T. R. Shrout and A. Halliyal, "Preparation of Lead based Ferroelectric Relaxors for Capacitors", Am. Cerm. Soc. Bull., 66[4], 704 919870; M. T. Lanagan, N. Yang, D. C. Dube and S. J. Jang, "Dielectric Behavior of the Relaxor $Pb[Mg_{1/3}Nb_{2/3}]O_3$ Solid-Solution System in the Microwave Region", J. Am. Ceram. Soc., 72[3], 481, 83 (1989)). They can be sintered at low temperatures and show stable temperature coefficients in a range of operation temperatures with a broad range of dielectric constants. They are quite different from the present invention in technical constitution.

SUMMARY OF THE INVENTION

Accordingly, the art has long sought a dielectric ceramic composition for capacitors, capable of being low-temperature sintered and showing high dielectric constants and low dielectric loss coefficients.

The intensive and thorough research on the dielectrics suitable for capacitors required by contemporary industry standards, repeated by the present inventors, resulted in the finding that, in a two-component system consisting of $Pb(Fe_{1/2}Ta_{1/2})O_3$ and $Pb(Fe_{1/2}Nb_{1/2})O_3$, the molar ratio of the two components has a great influence of sintering temperature while a certain metal plays an important role in determining the dielectric loss coefficient.

Therefore, it is an object of the present invention to provide a dielectric ceramic composition for capacitors, which can be sintered at a temperature as low as or lower than 1,000° C.

It is another object of the present invention to provide a dielectric ceramic composition for capacitors, which allows silver as a main material for the internal electrodes of the capacitors.

It is a further object of the present invention to provide a dielectric ceramic composition for capacitors, which is superior in dielectric constant and dielectric loss coefficient, both.

These and other objects are attained in a dielectric ceramic composition comprising (1–x) $Pb(Fe_{1/2}Ta_{1/2})O_3$-$xPb(Fe_{1/2}Nb_{1/2})O_3$ wherein $0.35 \leq x \leq 0.65$, and 0.01–0.5% by weight of manganese, chromium or cobalt.

DESCRIPTION OF THE INVENTION

The dielectric ceramic composition of the present invention is based on $Pb(Fe_{1/2}Ta_{1/2})O_3$ and $Pb(Fe_{1/2}Nb_{1/2})O_3$ in combination with a manganese oxide. On the whole, the sintering temperature of the composition is determined by the molar ratio between $Pb(Fe_{1/2}Ta_{1/2})O_3$ and $Pb(Fe_{1/2}Nb_{1/2})O_3$. The presence of manganese in the composition enhances the dielectric properties, including dielectric constant and dielectric loss coefficient.

For best results, the molar ratio between $Pb(Fe_{1/2}Ta_{1/2})O_3$ and $Pb(Fe_{1/2}Nb_{1/2})O_3$ resides in a range of 0.35:0.65 to 0.65:0.35 and manganese is present at an amount of 0.01–0.5% by weight based on the total weight of the composition.

A similar advantage can be obtained by using a transition metal, such as chromium or cobalt, instead of manganese.

The following examples are set forth to illustrate more clearly the principles and practice of this invention to one skilled in the art. As such, they are not intended to limit the invention, but are illustrative of certain preferred embodiments.

EXAMPLES I TO XXIX 99.5% pure PbO, $Fe_2O_3$, $Ta_2O_5$, $Bb_2O_5$, manganese oxide, chrome and cobalt were powdered and weighed as indicated in Table 1, below. The weighed powder was wet-mixed by a ball milling method, followed by calcination (ignition to eliminate volatile contents) at 800° C. for 1 hour. The calcined materials were pulverized to give fine powder which was, then, molded into circular plates, 0.6–0.8 mm in thickness and 12 mm in diameter, under a pressure of 0.7 ton/cm². After being sintered at 900–1,000° C. for 1–10 hours, the circular plates were heated at 600–700° C. to attach Ag electrodes thereto. The electrical properties of the plate samples thus prepared were measured and the results are given in Table 1.

TABLE 1

Electrical Properties of Dielectric Ceramic Compositions

| EXAMP. | Main component (mol %) | | Sub component | Sinter Temp. | Dielec. const. | Dielec. loss Coeffi. tanδ | Specific resist. |
|---|---|---|---|---|---|---|---|
| | $Pb(Fe_{1/2}Ta_{1/2})O_3$ | $Pb(Fe_{1/2}Nb_{1/2})O_3$ | (wt %) | (° C.) | (K) | (%) | (Ω · cm) |
| I* | 0.2 | 0.8 | Mn 0.05 | 1030 | 8250 | 3.5 | $2 \times 10^{11}$ |
| II* | 0.2 | 0.8 | Mn 0.2 | 1030 | 7540 | 3.1 | $7 \times 10^{11}$ |

TABLE 1-continued

Electrical Properties of Dielectric Ceramic Compositions

| EXAMP. | Main component (mol %) $Pb(Fe_{1/2}Ta_{1/2})O_3$ | $Pb(Fe_{1/2}Nb_{1/2})O_3$ | Sub component (wt %) | Sinter Temp. (° C.) | Dielec. const. (K) | Dielec. loss Coeffi. tanδ (%) | Specific resist. (Ω · cm) |
|---|---|---|---|---|---|---|---|
| III* | 0.3 | 0.7 | Mn 0.05 | 1000 | 8750 | 2.5 | $5 \times 10^{11}$ |
| IV* | 0.3 | 0.7 | Mn 0.2 | 1000 | 7800 | 5.5 | $6 \times 10^{8}$ |
| V# | 0.4 | 0.6 | — | 1050 | 21000 | 6.2 | $3 \times 10^{8}$ |
| VI+ | 0.4 | 0.6 | Mn 0.05 | 980 | 19100 | 0.4 | $1 \times 10^{11}$ |
| VII+ | 0.38 | 0.62 | Mn 0.2 | 980 | 14500 | 1.1 | $1.5 \times 10^{11}$ |
| VIII+ | 0.43 | 0.57 | Cr 0.05 | 980 | 18900 | 0.5 | $3 \times 10^{11}$ |
| IX+ | 0.37 | 0.63 | Cr 0.2 | 980 | 15000 | 1.2 | $1 \times 10^{11}$ |
| X+ | 0.4 | 0.6 | Co 0.05 | 980 | 19200 | 0.4 | $5 \times 10^{11}$ |
| XI+ | 0.41 | 0.59 | Co 0.2 | 980 | 14000 | 1.3 | $7 \times 10^{11}$ |
| XII# | 0.5 | 0.5 | — | 1030 | 20000 | 5.7 | $4 \times 10^{8}$ |
| XIII+ | 0.5 | 0.5 | Mn 0.05 | 980 | 18900 | 0.9 | $6 \times 10^{11}$ |
| XIV+ | 0.48 | 0.52 | Mn 0.2 | 980 | 17800 | 1.4 | $6.5 \times 10^{11}$ |
| XV+ | 0.5 | 0.5 | Cr 0.05 | 980 | 18700 | 0.9 | $5.4 \times 10^{11}$ |
| XVI+ | 0.5 | 0.5 | Cr 0.2 | 980 | 17500 | 1.3 | $7.6 \times 10^{11}$ |
| XVII+ | 0.52 | 0.48 | Co 0.05 | 980 | 18800 | 0.8 | $8 \times 10^{11}$ |
| XVIII+ | 0.47 | 0.53 | Co 0.2 | 980 | 17300 | 1.2 | $2 \times 10^{11}$ |
| XIX# | 0.6 | 0.4 | — | 1050 | 22000 | 6.5 | $5 \times 10^{8}$ |
| XX+ | 0.62 | 0.38 | Mn 0.05 | 980 | 14200 | 0.8 | $2 \times 10^{11}$ |
| XXI+ | 0.63 | 0.37 | Mn 0.2 | 980 | 13900 | 1.9 | $2.4 \times 10^{11}$ |
| XXII+ | 0.58 | 0.42 | Cr 0.05 | 980 | 14500 | 1.0 | $3.5 \times 10^{11}$ |
| XXIII+ | 0.57 | 0.43 | Cr 0.2 | 980 | 13500 | 1.5 | $6 \times 10^{11}$ |
| XXIV+ | 0.6 | 0.4 | Co 0.05 | 980 | 14300 | 1.1 | $4 \times 10^{11}$ |
| XXV+ | 0.6 | 0.4 | Co 0.2 | 980 | 13300 | 1.4 | $3.8 \times 10^{11}$ |
| XXVI* | 0.7 | 0.3 | Mn 0.05 | 1000 | 9500 | 3.7 | $4 \times 10^{11}$ |
| XXVII* | 0.7 | 0.3 | Mn 0.2 | 1000 | 8550 | 4.2 | $5 \times 10^{11}$ |
| XXVIII* | 0.8 | 0.2 | Mn 0.05 | 1000 | 8400 | 4.1 | $1 \times 10^{11}$ |
| XXIX* | 0.8 | 0.2 | Mn 0.2 | 1000 | 7750 | 4.7 | $1.5 \times 10^{11}$ |

*Comparative samples
+Samples of the invention
Absent of Mn

In Table 1, the dielectric constants (K) and dielectric loss coefficients (tanδ) were measured at 25° C. at 1 kHz by use of an LCR meter while the specific resistance was determined at a direct current voltage of 100 V by use of a high resistance meter.

As shown in Table 1, the compositions of Examples V, XII and XIX, which contained no manganese oxides, are improper to be used for ceramic condensers because of their low specific resistance. When manganese (Mn) was complemented at an amount of 0.05 wt % and 0.2 wt % to the compositions of Example V, XII and XIX, the specific resistance of the resulting compositions was increased by $10^3$ factor. In the high dielectric ceramic composition according to the present invention, manganese oxide is preferably present at an amount of 0.01 to 0.5% by weight. For example, if manganese oxide is present at an amount less than 0.01% by weight, a significant increase in specific resistance is not attained. On the other hand, excess manganese oxide weakens the mechanical strength of the resulting dielectrics.

In the presence of manganese at an amount of 0.01 to 0.5 % by weight, when the mol % of $Pb(Fe_{1/2}Ta_{1/2})O_3$ to $Pb(Fe_{1/2}Nb_{1/2})O_3$ ranged from 0.2:0.8 to 0.8:0.2, a notable change was not detected in specific resistance with a dielectric constant being in a range of about 7,500 to 9,500, as in Examples I to IV and XXVI to XXIX. Under this condition, the samples of these Examples were 2.5 to 4.7% in dielectric loss coefficient (tanδ). These temperature coefficients are better than those obtained in the absence of manganese oxides.

On the other hand, when the mol % of $Pb(Fe_{1/2}Ta_{1/2})O_3$ to $Pb(Fe_{1/2}Nb_{1/2})O_3$ was about 0.4:0.6 to 0.6:0.4 in the presence of 0.2 or 0.05% by weight of manganese, the dielectric constant was at least 13,900 while the dielectric loss coefficient was below 2% at 25° C., as shown in Examples 6, 7, 13, 14, 20 and 21. Thus, it is apparent that the dielectric compositions of these examples are far better in temperature-dependent dielectric loss coefficient than other compositions. In detail, the dielectric compositions which comprise $Pb(Fe_{1/2}Ta_{1/2})O_3$ and $Pb(Fe_{1/2}Nb_{1/2})O_3$ in a molar ratio of 0.35:0.65 to 0.65:0.35 in combination with Mn, Co or Cr have high dielectric constants and low dielectric loss coefficients (below 2%) while the compositions which comprise $Pb(Fe_{1/2}Ta_{1/2})O_3$ and $Pb(Fe_{1/2}Nb_{1/2})O_3$ in a molar ratio exceeding the above range are relatively low in dielectric constant and high in dielectric loss coefficient and the dielectric compositions which comprise no sub-components, such as Mn, Co and Cr, show very high dielectric loss coefficients. Also, the data of Table 1 demonstrate that Co or Cr can be used instead of Mn without deteriorating the temperature-dependent dielectric loss coefficient.

As described hereinbefore, the dielectric ceramic compositions of the present invention can be sintered at a temperature less than 1,000° C., so that they are suitable for ceramic condensers and Ag-based internal electrodes can be employed in the layer-built ceramic condensers made of the compositions, providing still more economical favors than precious metals. What is better, the dielectric ceramic compositions of the present invention are superior in dielectric properties because they have a dielectric constant ranging from about 15,000 to 20,000 and show a dielectric loss coefficient less than 2% in a temperature of –55 to 125° C.

Although the invention has been described in detail by referring to certain preferred embodiments, it will be understood that various modifications can be made within the spirit and scope of the invention. The invention is not to be limited except as set forth in the following claims.

What is claimed is:

1. A high dielectric ceramic composition, comprising a two-component system based on $Pb(Fe_{1/2}Ta_{1/2})O_3$ and $Pb(Fe_{1/2}Nb_{1/2})O_{31}$ in combination with a metal sub component.

2. A high dielectric ceramic composition as set forth in claim 1, wherein the two-component system is composed of $(1-x)\ Pb(Fe_{1/2}Ta_{1/2})O_3 xPb\ (Fe_{1/2}Nb_{1/2})O_3$ wherein $0.35 \leq x \leq 0.65$.

3. A high dielectric ceramic composition as set forth in claim 1, wherein the metal sub component is manganese and is present at an amount of 0.01 to 0.5%.

4. A high dielectric ceramic composition as set forth in claim 1, wherein the metal sub component is Cr or Co.

* * * * *